US012382980B2

United States Patent
Skiff et al.

(10) Patent No.: US 12,382,980 B2
(45) Date of Patent: Aug. 12, 2025

(54) FLAVORED COMPOSITION

(71) Applicant: FIRMENICH SA, Satigny (CH)

(72) Inventors: Ronald Skiff, Plainsboro, NJ (US); Pierre-Etienne Bouquerand, Satigny (CH)

(73) Assignee: FIRMENICH SA, Satigny (CH)

( * ) Notice: Subject to any disclaimer, the term of this patent is extended or adjusted under 35 U.S.C. 154(b) by 322 days.

(21) Appl. No.: 17/904,893

(22) PCT Filed: Feb. 24, 2021

(86) PCT No.: PCT/EP2021/054504
§ 371 (c)(1),
(2) Date: Aug. 24, 2022

(87) PCT Pub. No.: WO2021/170616
PCT Pub. Date: Sep. 2, 2021

(65) Prior Publication Data
US 2023/0138413 A1  May 4, 2023

Related U.S. Application Data

(60) Provisional application No. 62/981,613, filed on Feb. 26, 2020.

(30) Foreign Application Priority Data

Mar. 10, 2020 (EP) .................................. 20161996

(51) Int. Cl.
A23L 27/00 (2016.01)
A23F 3/40 (2006.01)

(52) U.S. Cl.
CPC .............. *A23L 27/70* (2016.08); *A23F 3/405* (2013.01)

(58) Field of Classification Search
CPC ................................. A23L 27/70; A23F 3/405
USPC ........................................................... 426/89
See application file for complete search history.

(56) References Cited

U.S. PATENT DOCUMENTS

| 4,880,649 A | 11/1989 | Holzner et al. |
| 2015/0230491 A1* | 8/2015 | Looft .................. A23F 3/405 426/597 |
| 2019/0045824 A1 | 2/2019 | Bouquerand et al. |

FOREIGN PATENT DOCUMENTS

WO     2008075945 A1    6/2008

OTHER PUBLICATIONS

International Search Report and Written Opinion for corresponding PCT/EP2021/054504 mailed May 7, 2021; 12 pages.

* cited by examiner

*Primary Examiner* — Brent T O'Hern
(74) *Attorney, Agent, or Firm* — Armstrong Teasdale LLP

(57) ABSTRACT

The present disclosure relates to the field of delivery systems. Disclosed herein are a flavored composition, a process for preparing a flavored composition and consumer products including said flavored composition.

6 Claims, No Drawings

FLAVORED COMPOSITION

CROSS-REFERENCE TO RELATED APPLICATIONS

This application is a U.S. National Phase application of International Patent Application No. PCT/EP2021/054504, filed Feb. 24, 2021, which claims priority to European Patent Application No. 20161996.2, filed Mar. 10, 2020, and U.S. Provisional Application No. 62/981,613, filed Feb. 26, 2020, each of which is hereby incorporated by reference herein.

TECHNICAL FIELD

The present invention relates to the field of delivery systems. More particularly, the invention pertains to a flavored composition. Process for preparing a flavored composition is also an object of the invention. Consumer products comprising said flavored composition are also part of the invention.

BACKGROUND OF THE INVENTION

One of the problems faced by the flavour industry lies in the relatively rapid loss of olfactive benefit provided by active compounds due to their volatility, particularly that of "top-notes". The encapsulation of those active substances provides at the same time a protection of the ingredients there-encapsulated against "aggressions" such as oxidation or moisture and allows, on the other hand, a certain control of the kinetics of flavour release to induce sensory effects through sequential release.

Furthermore, the consumer demand for natural compositions is more and more important and is driving therefore the development of new delivery systems.

Therefore, there is a need to provide natural flavoured compositions. Furthermore, there is a need to find alternative solutions to existing processes, with the purpose of coating an emulsion on an insoluble food carrier while preserving the active volatiles to be encapsulated. The present invention solves this problem by providing a new flavoured composition and a new process taking place preferably at low temperature (typically less than 70° C.) or even at room temperature which allows to efficiently coating a flavoured emulsion on an insoluble food carrier.

SUMMARY OF THE INVENTION

The flavoured composition of the present invention constitutes a solution to the above-mentioned problems as it allows preparing a flavoured composition comprising a natural extract while preserving the volatile ingredients there-encapsulated.

In a first aspect, the present invention relates to a dry flavored composition comprising:
  an insoluble food carrier,
  a coating on the insoluble carrier, wherein the coating comprises:
    an oil phase comprising a flavor oil,
    a polar phase comprising a water-soluble matrix material and an aqueous natural extract comprising a water-soluble flavor,
    optionally an emulsifier.

Another object of the invention is a process for preparing the dry flavored composition as defined above, wherein the process comprises the steps of:

a) Preparing an oil-in-water emulsion comprising:
  an oil phase comprising a flavor oil,
  a polar phase comprising a water-soluble matrix material and an aqueous natural extract comprising a water-soluble flavor,
  optionally an emulsifier
b) Blending the emulsion with an insoluble food carrier to form a dry flavored composition.

A third aspect of the invention is a food or beverage consumer product comprising the flavored composition as defined above.

DETAILED DESCRIPTION OF THE INVENTION

Unless stated otherwise, percentages (%) are meant to designate a percentage by weight of a composition.

By "room temperature" it is meant a temperature typically comprised between 20° C. and 30° C.

By "water-soluble flavour or flavour oil", it is meant a single flavouring compound or a mixture of several flavouring compounds.

For the sake of clarity, the expression "emulsion" in the present invention is meant to designate a system in which "particles" are dispersed in a continuous phase of a different composition and specifically includes a dispersion or a suspension. For avoidance of doubt, a capsules slurry dispersed in a water phase falls under the definition of an emulsion, as well as "free" i.e. non-encapsulated oil dispersed in a water phase, but also a mixture thereof.

"Emulsifiers" are amphiphilic molecules that concentrate at the interface between two phases and modify the properties of that interface. Examples of emulsifiers can be found in *Mccutcheon's Emulsifiers & Detergents or the Industrial Surfactants Handbook*.

By "dry flavoured composition", it should be understood that the flavoured composition has a water activity below 0.6, preferably below 0.5, more preferably below 0.4.

By "coating", it encompasses a coating composition that is homogeneously coated (i.e fully coated) on the carrier but also a coating composition that is heterogeneously coated (i.e partially coated) on the carrier.

In the present invention, "flavour" and "flavor" are used indifferently.

In the present invention, "flavoured composition" and "flavored composition" are used indifferently.

The present invention relates in a first aspect to a dry flavored composition comprising:
  an insoluble food carrier,
  a coating on the insoluble carrier, wherein the coating comprises:
    an oil phase comprising a flavor oil,
    a polar phase comprising a water-soluble matrix material and an aqueous natural extract comprising a water-soluble flavor,
    optionally an emulsifier According to the invention, the coating comprises a flavor oil in the oil phase. According to a particular embodiment, the oil phase consists of a flavor oil.

By "water-soluble flavor or flavour oil" it is meant here a flavouring ingredient or a mixture of flavouring ingredients, solvent or adjuvants of current use for the preparation of a flavouring formulation, i.e. a particular mixture of ingredients which is intended to be added to an edible composition or chewable product to impart, improve or modify its organoleptic properties, in particular its flavour and/or taste. Taste modulator is also encompassed in said definition. Flavouring ingredients are well known to a skilled person in the art and their nature does not warrant a detailed description here, which in any case would not be exhaustive, the skilled flavourist being able to select them on the basis of his general knowledge and according to the intended use or application and the organoleptic effect it is desired to achieve. Many of these flavouring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, can Nostrand Co., Inc. Solvents and adjuvants or current use for the preparation of a flavouring formulation are also well known in the art.

In a particular embodiment, the flavour oil is selected from the group consisting of terpenic flavours including citrus and mint oil, and sulfury flavours.

Particular ingredients provided herein are flavor oil characterized by a log P value of 2 or more.

According to the invention, the coating comprises an aqueous natural extract comprising a water-soluble flavor in the polar phase.

The natural extract can be chosen from the group consisting of fruit juices, fruit syrup, fruit extract, coffee extract, honey extract, extracts of flowers, leaves and mixtures thereof.

According to an embodiment, the natural extract comprises up to 10% by weight of a water-soluble flavor.

A water-soluble flavor becomes completely dispersed and dissolved in the water phase without the formation of oil droplets which may be suspended or float to the surface, insoluble solids, or any other particulates that are visible to the naked eye. Typically, the water-soluble flavor forms a one phase solution when dissolved in water below its solubility limit.

According to a particular embodiment, the water-soluble flavor has a Log P value less than 2.

According to a particular embodiment, the flavor oil has a Log P value greater than 2.

According to an embodiment, the weight ratio between the water-soluble flavor and the flavor oil is preferably above 0.05, more preferably above 0.06.

The flavor oil defined in the present invention is hydrophobic (i.e non water soluble). In other words, the flavor oil forms two phases when dispersed in water contrary to the water-soluble flavour (or the aqueous extract) in the polar phase which forms a single phase when dispersed in water.

According to the invention, the water-soluble flavor and the flavor oil are different.

According to a particular embodiment, the water-soluble flavour is a natural extract.

According to one embodiment, the coating comprises flavor in the form of a free flavor (flavor oil and/or water-soluble flavor). What is meant by "free flavor" in the context of the invention is a flavor that is not encapsulated. According to a second embodiment, the flavor is in an encapsulated form. According to a third embodiment, the flavor is a mixture of free flavor and encapsulated flavor, the latter preferably consisting of water-insoluble microcapsules. Those microcapsules can be obtained by any process known in the art and do not necessitate a more detailed description. As non-limiting examples, those water-insoluble microcapsules can be obtained by a process selected from the group consisting of interfacial polymerisation, polycondensation, simple and complex coacervation or a combination thereof. According to a particular embodiment the microcapsules have a core-shell structure with a polymeric shell. The nature of the polymeric shell from the microcapsules of the invention can vary.

According to another embodiment, the microcapsules have a polymeric shell resulting from complex coacervation wherein the shell is possibly cross-linked such as described in WO2014044840 or WO2013174921.

According to an embodiment, the coating comprises dry flavoring ingredients that are well known by the person skilled in the art.

The matrix material used in the present invention is water soluble. A "water soluble matrix material" is intended for the purpose of the present invention as encompassing any carrier which forms a one-phase solution in water. Preferably, it forms a one phase solution when dissolved in water at concentrations as high as 20% by weight, more preferably even as high as 50% by weight. Most preferably it forms a one phase solution when dissolved in water at any concentration.

As non-limiting examples, maltodextrin, modified starch, inulin, plant-based proteins such as pea protein, soluble flours, gums such as Gum Arabic, soluble fibers, soluble polysaccharides, and mixtures thereof can be used as matrix material.

According to a particular embodiment, the water-soluble matrix material is gum arabic.

According to a particular embodiment, the water-soluble matrix material is not starch such as maltodextrins or modified starch.

The term "soluble fiber" as used herein refers to polysaccharides characterized as being soluble by using the official method of the Association of Official Analytical Chemists (Prosky et al, 1988; J. Assoc. Off Anal. Chem, 70, 5, 1017), e.g. water-soluble fibers, e.g. water soluble at room temperature. Said soluble fiber may be for example fruit fiber, grain fibers, natural soluble fibers and synthetic soluble fibers. Natural fibers include Soluble Corn Fiber, maltodextrin, acacia and hydrolyzed guar gum. Synthetic soluble fibers include polydextrose, modified food starch, and similar. Food grade sources of soluble fiber useful in embodiments of the present invention include inulin, corn fiber, barley, corn germ, ground oat hulls, milled corn bran, derivatives of the aleurone layer of wheat bran, flax flour, whole flaxseed bran, winter barley flake, ground course kilned oat groats, maize, pea fiber (e.g. Canadian yellow pea) Danish potatoes, konjac vegetable fiber, psylliumfiber from seed husks of planago ovate, *psyllium* husk, liquid agave fiber, rice bran, oat sprout fibers, amaranth sprout, lentil flour, grape seed fiber, apple, blueberry, cranberry, fig fibers, ciranda power, carob powder, milled prune fiber, mango fiber, apple fiber, orange, orange pulp, strawberry, carrageenan hydrocolloid, derivatives of eucheuma cottonnil seaweed, cottonseed, soya, kiwi, acacia gum fiber, bamboo, chia, potato, potato starch, pectin (carbohydrate) fiber, hydrolyzed guar gum, carrot, soy, soybean, chicory root, oat, wheat, tomato, polydextrose fiber, refined corn starch syrup, isomalto-oligosaccharide mixtures, soluble dextrin, mixtures of citrus bioflavonoids, cell-wall broken nutritional yeast, lipophilic fibers, plum juice, derivatives from larch trees, olygose fibers, derivatives from cane sugar, short-chain fructooligosaccharides, synthetic polymers of glucose, polydextrose, pectin, polanion compounds, cellulose fibers, cellulose fibers derived from hard wood plants and carboxymethyl cellulose.

According to a particular embodiment, the matrix material has emulsifying properties such as Gum Arabic. In this particular embodiment, the emulsifier is optional.

According to another embodiment, the emulsion further comprises an emulsifier. Typical emulsifiers include lecithin, glycerol esters, fatty acid esters, saponins, proteins, gum Arabic and mixtures thereof.

According to a particular embodiment, the emulsifier and the water soluble matrix material are different materials.

According to an embodiment, the coating comprises:
- between 5% and 25%, preferably between 7% and 23% of the oil phase based on the total weight of the coating, and/or
- between 2% and 65%, preferably between 2.5% and 61% of the aqueous natural extract based on the total weight of the coating, and/or
- between 25% and 80%, preferably between 30% and 75% of the matrix material based on the total weight of the coating, and/or
- between 0 and 5%, preferably between 1% and 3% of the emulsifier based on the total weight of the coating.

According to an embodiment, the insoluble food carrier is chosen in the group consisting of tea, coffee, herbal carrier, fruit carrier, flowers, leaves, beans/seeds, and other botanicals.

The insoluble food carrier may be in the form of leaves, in particular whole leaves, cut leaves, ground leaves, powders, in particular free-flowing powders, or particles.

According to a particular embodiment, the coating represents between 0.8 and 20% by weight, preferably between 1.5 and 10% based on the total weight of the flavored composition According to an embodiment, the flavored composition has a flavor oil loading greater than 1%, preferably greater than 3%, more preferably greater than 8%, even more preferably greater than 10%, even more preferably greater than 12% by weight based on the total weight of the flavored composition.

Another object of the invention is a process for preparing the dry flavored composition as defined above, wherein the process comprises the steps of:
a) Preparing an oil-in-water emulsion comprising:
   an oil phase comprising a flavor oil,
   a polar phase comprising a water-soluble matrix material and an aqueous natural extract comprising a water-soluble flavor,
   optionally an emulsifier
b) blending the emulsion with an insoluble food carrier to form a dry flavored composition.

Step b) of blending can be done either at room temperature and/or low pressure or at higher temperatures and/or low pressure.

During the blending step, to form the coating, the emulsion can be poured, sprinkled, sprayed, through a nozzle on the food carrier.

According to a particular embodiment, step b) is performed by blending the emulsion with an insoluble food carrier at a temperature less than 70° C. to form a dry flavored composition According to a particular embodiment, the blending step is performed at room temperature and the process described above is free of any drying step which involves water removal.

As drying step involving water removal, one may cite for example, a spray-drying step or fluidizing bed step.

According to another step, the blending step is performed under vacuum at a temperature comprised between 25° C. and 70° C.

As the process according to some embodiments does not involve high temperatures, it provides the advantage of reducing possible volatile losses and respecting the initial flavour profile. It is also a way of reducing the production costs and carbon footprint, and it avoids explosion risks associated with drying liquids in hot air.

According to one embodiment, flavour is in the form of a free oil dispersed in the water phase. What is meant by "free oil" in the context of the invention is an oil that is not encapsulated. According to a second embodiment, the flavour is in an encapsulated form dispersed in the water phase, i.e. in the form of a slurry. According to a third embodiment, the flavour is a mixture of free oil and encapsulated oil. When the suspension prepared in the first step of the invention comprises oil in an encapsulated form, the latter preferably consists of water-insoluble microcapsules. Those microcapsules can be obtained by any process known in the art and do not necessitate a more detailed description. As non-limiting examples, those water-insoluble microcapsules can be obtained by a process selected from the group consisting of interfacial polymerisation, polycondensation, simple and complex coacervation or a combination thereof. According to a particular embodiment the microcapsules have a core-shell structure with a polymeric shell. The nature of the polymeric shell from the microcapsules of the invention can vary.

According to another embodiment, the microcapsules have a polymeric shell resulting from complex coacervation wherein the shell is possibly cross-linked such as described in WO2014044840 or WO2013174921.

According to any one of the invention's embodiment, the oil phase represents between about 1% and 20% w/w, or even between 5% and 15% w/w or even between 7% and 10%, by weight, relative to the total weight of the emulsion.

According to any one of the invention's embodiment, the matrix material is used in an amount comprised between 25 and 50%, preferably between 25 and 35% by weight based on the total weight of the emulsion.

According to any one of the invention's embodiment, the aqueous natural extract represents between about 30% and 90% w/w, or even 50% and 70% w/w, by weight, relative to the total weight of the emulsion.

According to a particular embodiment, the insoluble food carrier has a water activity below 0.6 preferably below 0.5, preferably below 0.4.

According to a particular embodiment, at the end of step b), the flavored composition has a water activity below 0.6 preferably below 0.5, preferably below 0.4.

Water activity is a well-known parameter of expressing how much free water exists in a water-containing composition.

Water activity (aw) is the partial vapor pressure of water in a substance divided by the standard state partial vapor pressure of water. In the field of food science, the standard state is most often defined as the partial vapor pressure of pure water at the same temperature.

The water activity aw is defined as follows p/p* where p is the partial vapor pressure of water in the solution, and p* is the partial vapor pressure of pure water at the same temperature.

Aw is an intrinsic properties of a composition and can be easily determined by different methods such as resistive electrolytic, a capacitance or a dew point hygrometer.

Water activity has been determined at 25° with a Rotronic Hygrolab cell with four decimal digit and calibrated with saturated salt solutions, USING SUPPLIER Quick Aw® function estimating Aw after 5 to 6 min equilibration.

According to a particular embodiment, the food carrier has a water activity below the critical water activity of water-soluble matrix material, wherein the flavored composition after equilibration has still a water activity below the critical water activity of water-soluble matrix and the glass transition temperature of the flavored composition is equal or higher than 25° C. Critical water activity of water-soluble matrix (for example polysaccharides) aw* has been defined by several authors as the aw at which sufficient moisture is present to yield a glass transition value of 25° C. This practical metric of the hygroscopic stability of carbohydrate glasses can be measured or even predicted (M. Sillick, C. M. Gregson/Carbohydrate Polymers 79 (2010) 1028-1033).

According to a particular embodiment, the viscosity of the emulsion is greater than 500 mPa·s, preferably greater than 900 mPa·s, wherein the viscosity is measured at 25° C. with shear rate of 100 s$^{-1}$. The flow viscosity was measured using a TA Instruments AR2000 rheometer (New Castle, DE, USA) with concentric cylinder geometry.

According to an embodiment, no water is added at any stage of the process which can limit volatile losses during the blending step.

Another object of the present invention is a flavored consumer product comprising the flavored composition of the present invention. Preferably, the flavoured product is a food product or a beverage.

Typical food products are selected from the group consisting of an instant soup or sauce, a breakfast cereal, a powdered milk, a baby food, a powdered drink, a powdered chocolate drink, a spread, a powdered cereal drink, a chewing gum, an effervescent tablet, a cereal bar, and a chocolate bar. The powdered foods or drinks may be intended to be consumed after reconstitution of the product with water, milk and/or a juice, or another aqueous liquid.

The dry flavored composition provided herein may be suitable for conveying flavors to beverages, fluid dairy products, condiments, baked goods, frostings, bakery fillings, candy, chewing gum and other food products.

Beverages include, without limitation, powdered drinks, as well as liquid concentrates such as fountain syrups and cordials; hot beverages including malt drinks, cocoa, coffee and coffee-based drinks, coffee substitutes and cereal-based beverages; instant beverages, teas, including dry mix products as well as ready-to-drink teas (herbal and tealeaf based); fruit and vegetable juices and juice flavored beverages as well as juice drinks, nectars, concentrates, the dry flavored mouth care products or pharmaceutical products.

As non-limiting examples, the flavored consumer product is in the form of a
  Baked goods (e.g. bread, dry biscuits, cakes, other baked goods),
  Instant beverages (e.g. hot drinks, instant vegetable drinks, powdered soft drinks, instant coffee and tea, chocolate drinks, malt drinks),
  Cereal products (e.g. breakfast cereals, pre-cooked ready-made rice products, rice flour products, millet and sorghum products, raw or pre-cooked noodles and pasta products),
  condensed milk and analogues,
  Confectionary products (e.g. chewing gum, hard and soft candy)
  Chocolate and compound coatings
  Dried egg
  Vegetarian meat replacer, vegetarian burger
  Spices or spice preparations (e.g. mustard preparations, horseradish preparations), spice mixtures and, in particular seasonings which are used, for example, in the field of snacks.
  Snack articles (e.g. baked or fried potato crisps or potato dough products, bread dough products, extrudates based on maize, rice or ground nuts).

According to a particular embodiment, the consumer product comprising the flavored composition is in the form of hot or cold beverages, herbal infusions, coffee, tea, botanicals. According to a preferred embodiment, the flavored consumer product comprises the flavored composition according to the present invention in an amount between 0.8% and 100%, preferably between 1% and 50%, and most preferably between 1.5% and 20% based on the total weight of the flavored consumer product.

A further object of the present invention is a method of preparing the flavored consumer product, preferably a food product or a beverage, wherein the method comprises the following steps:

a. providing a consumer product, preferably a food product or beverage, b. adding the flavored composition of the present invention to the consumer product, preferably a food product or beverage.

The consumer product, preferably food product or beverage, to which the flavor composition may be added is a (flavored) consumer product, preferably food product or beverage, as described herein above without the flavor composition of the present invention.

The consumer product, preferably food product or beverage, may be flavored before adding the flavor composition of the present invention or may be not flavored.

The flavored composition may be added to the consumer product by any means of addition known by a person skilled in the art such as for example, but not limited to, conveying, mixing, coating, infusion or the like.

The invention will now be further described by way of examples. It will be appreciated that the invention as claimed is not intended to be limited in any way by these examples.

EXAMPLE 1

Preparation of a Flavored Composition According to the Invention

A solution is made by dissolving 30 g of Gum Arabic (Nexira-France) in a blend of aqueous extracts (43 g of Mango Naturome® extract (Firmenich) and 18 g of Pineapple aroma (Firmenich)). 9 g of a flavor oil (mango pineapple flavor (Firmenich)) are dispersed into the solution using a rotor stator mixer (Turrax™ IKA). The aqueous natural extract/oily flavor ratio is about 6.7. No additional water is added.

12.5 g of previous emulsion are slowly poured on 87.5 g of tea leaves containing 6% water and having a water activity of 0.4. During the addition, the tea blend is gently mixed with a spoon to obtain an homogeneous blend without aggregation. The water activity of the blend is about 0.96. After 30 min at 70° C. in vacuum oven the water activity of the blend is about 0.53 and leads to a good stability of the flavor encapsulation with time.

| Ingredient | Quantity |
|---|---|
| Flavor oil [1] | 94 |
| Aqueous natural extract [2] | 180 |

-continued

| Ingredient | Quantity |
|---|---|
| Aqueous natural extract [3] | 426 |
| Matrix material/emulsifier [4] | 300 |
| | 1000 |

[1] MANGO PINEAPPLE FLAVOR (Firmenich)
[2] PINEAPPLE FLAVOR (Firmenich)
[3] MANGO NATUROME ® (Firmenich)
[4] GUM ARABIC (Nexira-France)

EXAMPLE 2

Preparation of a Flavored Composition According to the Invention

A solution is made by dissolving 30 g of HiCap100™ (Octenly succinated starch-Ingredion) in a blend of aqueous extracts (45 g of Mango Naturome® extract (Firmenich) and 18 g of Raspberry aroma (Firmenich)). 7 g of a flavor oil (Strawberry flavor (Firmenich)) are dispersed into the solution using a rotor stator mixer (Turrax™ IKA). The aqueous natural extract/oily flavor ratio is about 9. No additional water is added.

12.5 g of previous emulsion are slowly poured on 87.5 g of tea leaves containing 6% water and having a water activity of 0.4. During the addition, the tea blend is gently mixed with a spoon to obtain an homogeneous blend without aggregation. The water activity of the blend is about 1. After 30 min at 70° C. in vacuum oven the water activity of the blend is about 0.48 and leads to a good stability of the flavor encapsulation with time.

| Ingredient | Quantity |
|---|---|
| Flavor oil [1] | 70 |
| Aqueous natural extract [2] | 180 |
| Aqueous natural extract [3] | 450 |
| Matrix material/emulsifier [4] | 300 |
| | 1000 |

[1] STRAWBERRY FLAVOR (Firmenich)
[2] RASPBERRY FLAVOR (Firmenich)
[3] RASPBERRY NATUROME ® (Firmenich)
[4] Hi-cap (INGREDION)

EXAMPLE 3

Preparation of a Flavored Composition According to the Invention

A solution is made by mixing a blend of aqueous extracts: 44.4 g of Strawberry Naturome® extract (Firmenich) and 17 g of raspberry aroma (Firmenich). Then 30 g of HiCap100™ (Octenly succinated starch-Ingredion) is dissolved into the previous blend and finally 8.6 g of a flavor oil (mixed berries flavor (Firmenich)) are dispersed into the solution using a rotor stator mixer (Turrax™ IKA). No additional water is added. 12.5 g of previous emulsion are slowly poured on 87.5 g of tea leaves containing 6% water and having a water activity of 0.4. During the addition, the tea blend is gently mixed with a spoon to obtain an homogeneous blend without aggregation. The water activity of the blend is about 1.

After 30 min at 70° C. in vacuum oven the water activity of the blend is about 0.48 and leads to a good stability of the flavor encapsulation with time.

| Ingredient Name | Qty |
|---|---|
| Flavor oil [1] | 86.00 |
| Matrix material/emulsifier [2] | 300.00 |
| Aqueous natural extract [3] | 170.00 |
| Aqueous natural extract [4] | 444.00 |
| | 1000.00 |

[1] MIXED BERRIES FLAVOR (Firmenich)
[2] Hi-Cap™ (INGREDION)
[3] RASPBERRY FLAVOR (Firmenich)
[4] STRAWBERRY NATUROME ® (Firmenich)

EXAMPLE 4

Preparation of a Flavored Composition According to the Invention

A solution is made by mixing a blend of aqueous extracts: 34 g of blueberry flavor (Firmenich) and 34 g of raspberry flavor (Firmenich). Then 30 g of Arabic gum (Nexira) is dissolved into the previous blend and finally 2 g of a flavor oil (mixed berries flavor (Firmenich)) are dispersed into the solution using a rotor stator mixer (Turrax™ IKA). No additional water is added.

12.5 g of previous emulsion are slowly poured on 87.5 g of tea leaves containing 6% water and having a water activity of 0.4. During the addition, the tea blend is gently mixed with a spoon to obtain an homogeneous blend without aggregation. The water activity of the blend is about 1. After 30 min at 70° C. in vacuum oven the water activity of the blend is about 0.48 and leads to a good stability of the flavor encapsulation with time.

| Ingredient Name | Qty |
|---|---|
| Flavor oil [1] | 20 |
| Matrix material/emulsifier [2] | 300 |
| Aqueous natural extract [3] | 340 |
| Aqueous natural extract [4] | 340 |
| | 1000.00 |

[1] MIXED BERRIES FLAVOR (Firmenich)
[2] GUM ARABIC (Nexira)
[3] RASPBERRY FLAVOR (Firmenich)
[4] BLUEBERRY FLAVOR (Firmenich)

The invention claimed is:
1. A dry flavored composition comprising:
an insoluble food carrier, and
a coating on the insoluble food carrier, wherein the coating comprises:
  an oil phase comprising a flavor oil,
  a polar phase comprising a water-soluble matrix material and an aqueous natural extract comprising a water-soluble flavor, and
  optionally an emulsifier,
wherein the coating represents between 0.8 and 20% by weight of a total weight of the flavored composition; and
wherein, when the flavored composition comprises the emulsifier, the water-soluble matrix material and the emulsifier are different materials.
2. The flavored composition according to claim 1, wherein the coating comprises:
between 5% and 25% of the oil phase based on the total weight of the coating, and/or between 2% and 65% of the aqueous natural extract based on the total weight of the coating, and/or between 25% and 80% of the matrix material based on the total weight of the coating, and/or between 0 and 5% of the emulsifier based on the total weight of the coating.

3. The flavored composition according to claim 1, wherein the aqueous natural extract is selected from the group consisting of fruit juices, fruit syrup, fruit extract, coffee extract, honey extract, extracts of flowers, leaves and mixtures thereof.

4. The flavored composition according to claim 1, wherein the matrix material is selected from the group consisting of maltodextrin, modified starch, inulin, plant-based proteins, gums, soluble fibers, soluble polysaccharides, and mixtures thereof.

5. The flavored composition according to claim 1, wherein the emulsifier is selected from the group consisting of lecithin, glycerol esters, fatty acid esters, saponins, proteins, gum Arabic, octenyl succinated starch, and mixtures thereof.

6. The flavored composition according to claim 1, wherein the insoluble food carrier is selected from the group consisting of tea, coffee, herbal carrier, fruit carrier, flowers, leaves, beans, seeds, and other botanicals.

* * * * *